United States Patent
Kejariwal et al.

(10) Patent No.: US 7,571,301 B2
(45) Date of Patent: Aug. 4, 2009

(54) FAST LOCK-FREE POST-WAIT SYNCHRONIZATION FOR EXPLOITING PARALLELISM ON MULTI-CORE PROCESSORS

(75) Inventors: Arun Kejariwal, Irvine, CA (US);
Hideki Saito, Sunnyvale, CA (US);
Xinmin Tian, Union City, CA (US);
Milind Girkar, Sunnyvale, CA (US);
Sanjiv Shah, Champaign, IL (US); Wei Li, Redwood City, CA (US); Utpal Banerjee, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 467 days.

(21) Appl. No.: 11/395,841

(22) Filed: Mar. 31, 2006

(65) Prior Publication Data

US 2007/0234326 A1 Oct. 4, 2007

(51) Int. Cl.
*G06F 9/45* (2006.01)
*G06F 9/52* (2006.01)
(52) U.S. Cl. ................... 712/215; 717/150
(58) Field of Classification Search .......... 712/215; 717/150, 157, 156, 160, 161
See application file for complete search history.

(56) References Cited

U.S. PATENT DOCUMENTS

| | | | |
|---|---|---|---|
| 6,282,708 B1 * | 8/2001 | Augusteijn et al. | 717/156 |
| 6,571,386 B1 * | 5/2003 | Figurin et al. | 717/154 |
| 6,671,878 B1 * | 12/2003 | Bliss | 717/161 |
| 6,820,250 B2 * | 11/2004 | Muthukumar et al. | 717/116 |
| 6,986,131 B2 * | 1/2006 | Thompson et al. | 717/160 |

OTHER PUBLICATIONS

Krothapalli, V.P. etal., Removal of Redundant Dependencies in DOACROSS Loops with Constant Dependencies, 1991,IEEE, pp. 281-289.*
Hwang, R.Y., Performance-oriented synchronization migration in a DOACROSS loop, Jul. 1996, IEE Proc-Comput. Digit Tech. vol. 141, No. 4, pp. 224-231.*
Su, Hong-Men etal., On Data Synchronization for Multiprocessors, ACM 1989, pp. 416-423.*
Tang,P etal., Reducing Data Communication Overhead for DOACROSS Loop Nests, ACM, 1994, pp. 44-53.*
Chen, Ding-Kai etal., An Efficient Algorithm for the Run-time Parallelism of DOACROSS Loops, 1994, IEEE, pp. 518-527.*

* cited by examiner

*Primary Examiner*—Eric Coleman
(74) *Attorney, Agent, or Firm*—Blakely, Sokoloff, Taylor & Zafman LLP

(57) ABSTRACT

A method for improving parallel processing of computer programs. DOACROSS loops and similar code are identified and parallelized using a post-wait control structure. The post-wait control structure may be implemented to include any one of a single counter to enforce an order of execution, an array to track code completion that is indexed by a modulus of a positive integer number, and/or a set of arrays to track a last code completed by a thread and a current code being executed by a thread.

27 Claims, 4 Drawing Sheets

```
DOACROSS i = 2,N          ~301
    A[i] = A[i - 2] + 2   ~303
    B[i] = A[i] * C[i]    ~305
End ~307
```
FIG. 3A
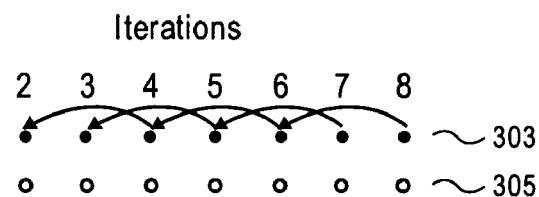
FIG. 3B
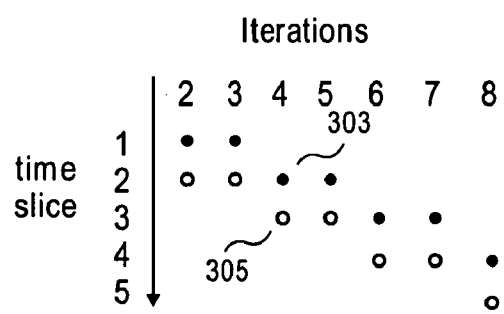
FIG. 3C
```
DOACROSS i = 2,N
    Update(i)            ~313
    Wait (i - 2)         ~311
        A[i] = A[i - 2] + 2   ~303
    Post(i)              ~315
        B[i] = A[i] * C[i]    ~305
End
```
FIG. 3D

FAST LOCK-FREE POST-WAIT SYNCHRONIZATION FOR EXPLOITING PARALLELISM ON MULTI-CORE PROCESSORS

BACKGROUND

1. Field of the Invention

The invention relates to a method for exploiting parallelism at a user level. Specifically, embodiments of the invention include a method for synchronizing the parallel execution of code by multiple threads on multi-core processors.

2. Background

Improvements in processing power in modern computer systems have concentrated primarily on increasing the clock speed and consequently the rate at which instructions can be executed by a processor. However, the rate of improvements in the speed of processors has slowed. This slow down in progress on clock and processing speed is attributed to limits based in semiconductor physics, thermal issues and power issues related to processor design. Much past progress has been accomplished through making increasingly smaller circuits and processor designs. However, this trend does not seem to hold promise in the future due to increasing operating temperatures and power consumption. As a result, increasing attention is being given to methods of improving the parallel processing of instructions, that is, improvements in parallelization.

Parallel processing of instructions is accomplished through the provision of multiple execution units and pipelining in single core processors. Increasing design complexity and negative clock effect have hampered the development of advanced microarchitectural techniques for extracting higher levels of parallelism. Recently, there has been increasing trend of developing hyper-threaded and multi-core processors to enable power-efficient means of parallel execution. This facilitates exploitation of thread-level parallelism by providing support for multiple hardware contexts.

Programmers have attempted to improve parallelization at the software level. However, most commonly used programming languages were not designed to exploit parallelism and do not give the programmer adequate tools for parallelizing software. Some extensions to these programming languages have been developed to improve the set of tools available to programmers. However, these software level tools are limited in their ability to extract parallelism to certain types of code sequences in programs. For example, these software level tools are able to exploit DOALL type parallelism, which are loop structures that do not have dependencies between iterations.

Exploitation of parallelism, including parallelization at the software level, requires that certain critical sections of the code be executed in program order. To ensure the proper order in executing these critical sections of code, synchronization mechanisms have been developed, such as semaphores and monitors at the kernel level and locks at the user level. Kernel-level synchronization incurs a high overhead forcing much synchronization at the user level. This again places the burden on an application programmer who has very basic and limited tools.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

FIG. 3A is a diagram of an example DOACROSS loop.

FIG. 3B is a diagram of an example set of dependencies in a DOACROSS loop.

FIG. 3C is a diagram of an example of an execution order of a set of dependencies in the DOACROSS loop.

FIG. 3D is a diagram of an example of a DOACROSS loop that has been modified to synchronize parallel processing of the loop.

DETAILED DESCRIPTION

Figure 1:
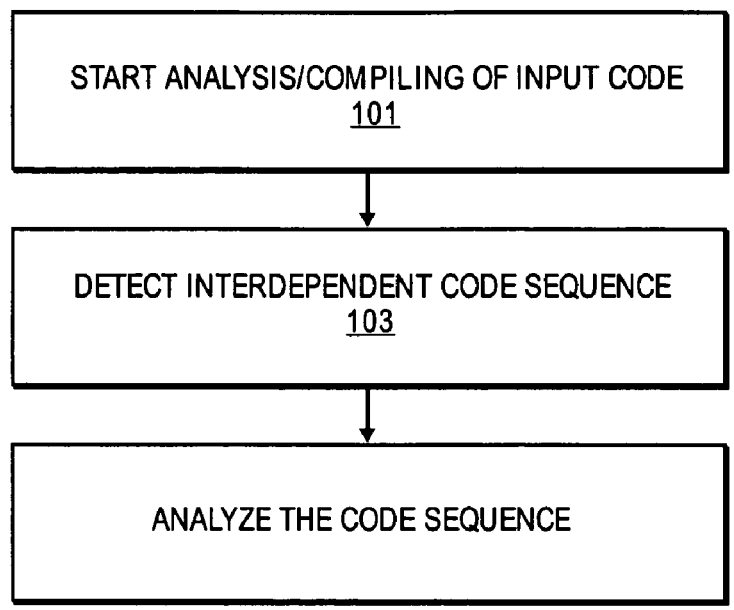
FIG. 1 is a flowchart of one embodiment of a process for parallelizing a target program.

FIG. 1 is a flowchart of one embodiment of a process for parallelizing a target code section. In one embodiment, the process may include starting the analysis and compilation of target code (block 101). Target code may be a sequence of instructions written in any language and of any length or size. Any type of code may be input and any type of appropriate compiler may also be utilized. In one embodiment, the code may be in any programming language. The code may have any intended purpose, such as an application, operating system or other program.

In another embodiment, the target code may be in an interpreted language. The analysis of the code may take place at run time by an interpreter or a run-time engine. For sake of convenience, the embodiments described herein are for compiled code, though the principles of the embodiments of the invention are equally applicable to interpreted code.

During the analysis and compilation of the target code, the code is analyzed to detect sequences with interdependencies that can be mapped into acyclic directed graphs (DAGs) that may be executed in parallel (block 103). The detection of DAGs may be by any well known detection algorithm. Any other suitable algorithm for detecting code sequences in the target code that may be executed in parallel may also be used.

In one embodiment, each time a suitable code sequence is detected, synchronization primitives may be inserted into the code sequence to allow parallel execution of the code sequence (block 105). These synchronization primitives protect critical code sections. The critical code sections are sequences of instructions that depend on the program order execution of other code sequences. The synchronization primitives enforce the program order execution of these sequences between multiple threads that may be executing different critical sections.

Figure 2:
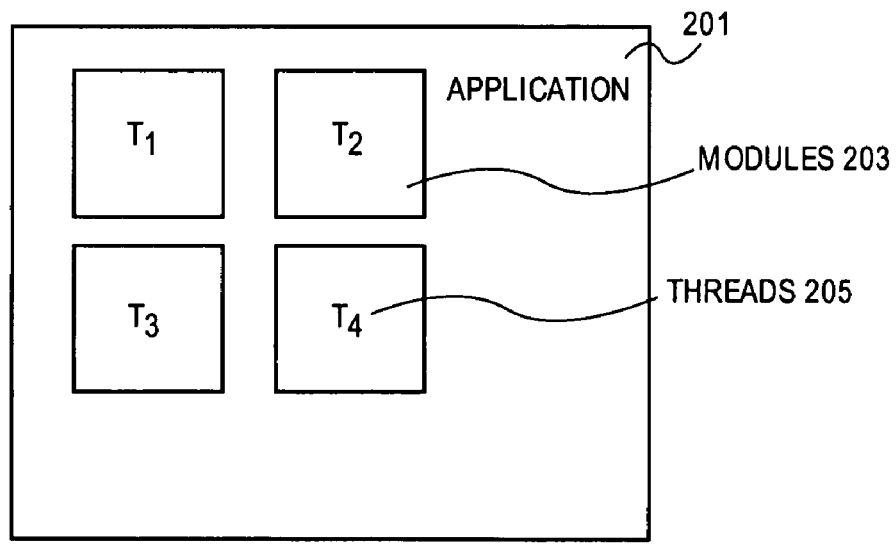
FIG. 2 is a diagram of one embodiment of an application divided into modules executed by separate threads.

FIG. 2 is a diagram of an example application that has been organized for parallel processing. An application 201 or similar program may be organized into separate modules 203 or similar sections of code to be executed separately. Each module 203 or separate section of code may be executed by a separate execution thread 205. In the example, the application 201 has been divided into four independent modules and four threads have been assigned to execute the application, each thread responsible for executing a separate module.

Each thread can operate independent of the other threads, unless a dependency exists between the modules. Multiple threads may also be used to execute a single module or even different iterations of the same sequence of instructions in a module. Most computer programs contain numerous loops such as do or while loops. Often a majority of the actual processing time of an application is spent within such loops. Finding parallelism within such loops can provide large gains in efficiency and throughput. A simple case is a loop in which each iteration is independent from other iterations. Such loops may be referred to as DOALL loops. Each iteration of a DOALL loop may be assigned to a separate thread for execution without danger of data corruption or deadlock. However, many loops contain internal dependencies that prevent such an easy parallelization.

FIG. 3A is an example loop in which a dependence between the iterations of the loop exists. The loop consists of a first term identifying the iteration range 301. In this example, the loop starts at an iteration labeled '2' and continues until an iteration 'N.' The first operation 303 within the loop has a dependency to other iterations. The assignment operation 303, assigns the value of a preceding iteration added to the value 2 to the spot in the array indexed by the current iteration. The second operation 305 makes an assignment in another array B that is independent of other iterations of the array. The final command in the loop identifies the end of the loop and possibly exit conditions for the loop. In this example, there are no exit conditions.

FIG. 3B is a diagram illustrating the dependencies between the iterations of the example DO loop shown in FIG. 3A. The example shows the dependencies between the iterations from i=2 until i=8 of the DO loop. For sake of convenience, the iterations will be referred to by their i numbers. The first operation 303 creates dependencies between the fourth and second iterations, the fifth and third iterations and the sixth and fourth iterations as indicated by the directed arrows between the iterations. The second operation 305 does not create any dependencies between the iterations.

FIG. 3C shows a parallel schedule of the example DO loop iterations over time; in other words, how the instructions of different iterations may be scheduled over time. In this example, each iteration has been assigned to a separate thread. During a first time slice, the second iteration and the third iteration of the first operation 303 may be performed, because they do not have dependencies on other iterations. In the second time slice, because the second iteration has completed the operation 303, the fourth and fifth iterations of the DO loop may also execute the operation 303. Similarly, in the third time slice the sixth iteration of the first operation 303 may be completed. In each iteration, the execution of the second operation 305 is delayed due to the dependence to the operation 303 within the same iteration. The delay may also be caused by the positioning of the synchronization (post) primitives in the DO loop, but such delay is not required as long as the value produced by the operation 303 is used in the operation of 305.

FIG. 3D is a diagram of an example modified DO loop in which the synchronization primitives are inserted to provide synchronization between the different threads which in itself is necessary for preserving the program semantics. At a high level, the functionality of the primitives is based on reads and writes to a shared control structure, referred to as a post-wait control structure. In this example, wait command 311 is positioned before the start of the critical code sequence 303. The wait command 311 prevents an executing thread from proceeding into the critical code section until the indicated iteration upon which it depends has completed. In this case, the iteration indicated by the current iteration number minus two must have completed. A post command 315 is positioned immediately after the critical section 303. The post command 'posts' the completion of the critical section, in this example identified with the corresponding iteration number. This enables threads waiting on the completion of this iteration of the critical section to proceed. Additional code, such as the second operation 305 may follow the post command 315. In one embodiment, an update primitive 313 may be utilized in conjunction with the post-wait synchronization primitives. The update primitive 313 writes to the shared post-wait synchronization construct to indicate the changes in the iterations being executed by a thread or set of threads. In another embodiment, the update command 313 may not be used. The use of the update command 313 is based on the embodiment of the post-wait control structure and function in use.

Wait commands may be implemented in several different ways. In one embodiment, a wait command may be implemented as a spin-wait. The waiting thread keeps polling the appropriate synchronization control structure. Although the spinning is done in the user space, in the context of multi-threaded systems, it can potentially adversely affect the performance as the waiting thread will consume processor cycles and other resources during the polling. In another embodiment, a sleep-wait implementation may be used. The waiting thread spins or polls for a predetermined time and then sleeps for a predetermined time anticipating that the iteration it is waiting on will not be done in the near future. While sleeping, the thread gives up its hold on resources and does not use processor cycles. In a further embodiment, a vector waiting implementation is used. A waiting thread goes to sleep after a predetermined time and is 'awoken' by the iteration being waited upon. The awakening may be implemented through a signaling mechanism.

Figure 4:
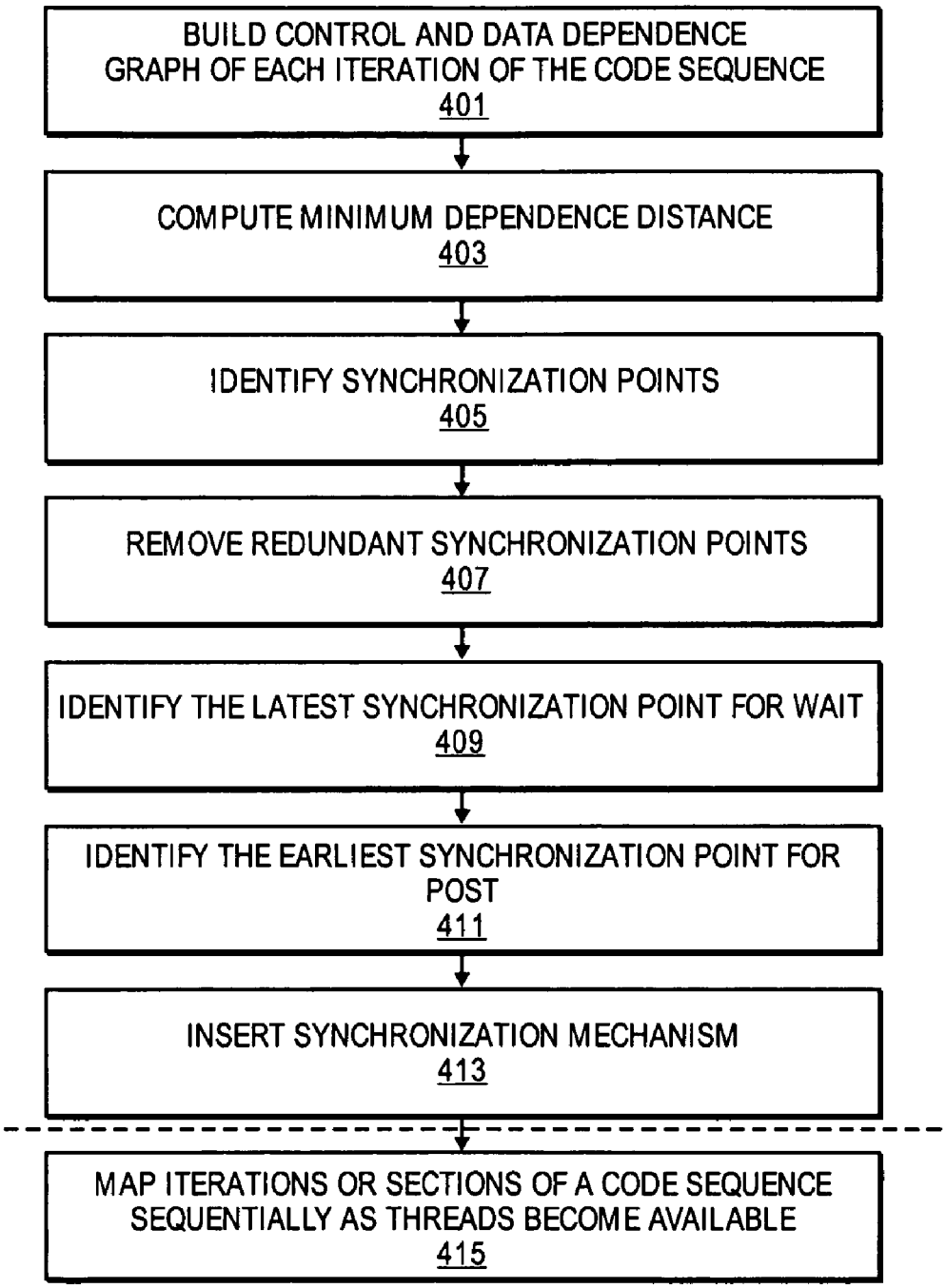
FIG. 4 is a flowchart of one embodiment of a process for parallelizing input code.

FIG. 4 is a flowchart of one embodiment of a process for inserting a post-wait control structure into a target code section. In one embodiment, as the code is being processed for compiling, a DO loop or similar code sequence may be identified in the target code. The compiler may build a control and data dependence graph of each iteration of the code sequence (block 401). A node in the graph corresponds to an iteration of the DO loop. A directed edge between two nodes represent dependencies in data and/or control between the corresponding iterations. In one embodiment, the graph may be searched to determine if the graph is acyclic or has similar characteristics that indicate its suitability for parallelization. For example, a DOACROSS loop is a candidate for parallelization. A DOACROSS loop is a DO loop that contains dependencies between iterations, but can be graphed as a DAG.

In one embodiment, a minimum distance dependence may be computed (block 403). The minimum distance dependence (MDD) is a value that may be utilized in certain embodiments to minimize processing time required, for example by reducing the number of calls to a wait primitive. In some embodiments, the total number of threads assigned to a critical section may be restricted to the MDD. It may be easier to keep concurrently executing iterations within the MDD than track a larger number of threads.

If a programmer has not inserted synchronization points, then these synchronization points may be identified automatically (block 405). The synchronization primitives, such as the post, wait and update commands may be inserted into the code at the identified points. Any algorithm or criteria may be used to identify the synchronization points. For example, a simple traversal of the program dependence graph can be used to identify the synchronization points. In case of loops, the source and the sink of dependence vectors in the corresponding iteration space represent the synchronization points.

In one embodiment, a pass may be made through the code sequence to identify redundant synchronization points (block 407). A programmer may place a set of synchronization points poorly causing redundant points to be placed in the code sequence. Even in context of compiler-driven automatic placement of synchronization points, there may exist redundant synchronization points. This, in part, can be attributed to poor program analysis. Removal of such redundant synchronization points helps in achieving better performance as it reduces the synchronization overhead. Also, automatically placed or programmer placed points may be grouped such that individual critical sections are merged to use a single or smaller number of synchronization points to minimize overhead.

In one embodiment, a post primitive may be inserted corresponding to the last post synchronization point (block 409). This is done so as to minimize the memory requirements of the shared synchronization perspective and also to minimize the overhead of post primitive calls by reducing the number of such calls.

In one embodiment, the synchronization points are inserted (block 413). The synchronization primitives may be inserted as pragmas by the programmer or may be automatically inserted by the compiler.

At compile time the code is parallelized using the proposed method. At run-time the iterations or sections of the code are assigned or mapped to threads as the threads become available (block 415). Similarly, if the code is interpreted, executed the parallelization techniques are applied and then the threads are assigned as they become available.

Figure 5A:
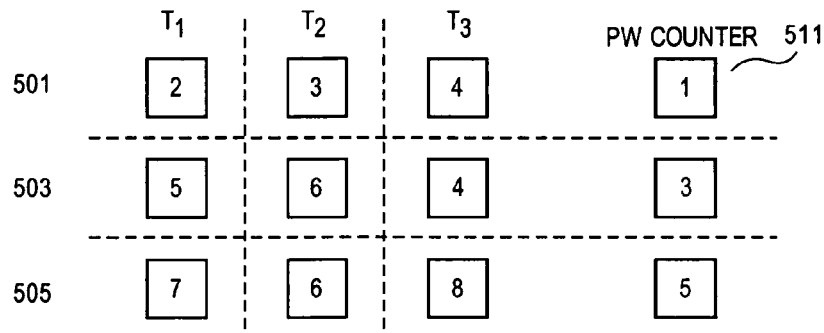
FIG. 5A is a diagram of one embodiment of a post-wait control structure.
Figure 5B:
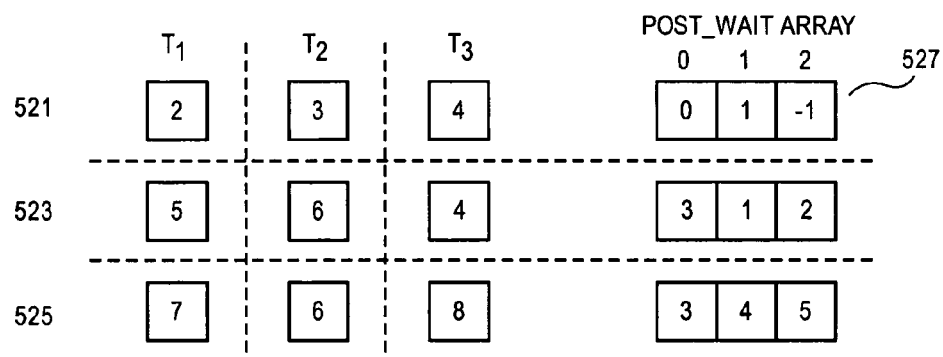
FIG. 5B is a diagram of one embodiment of a post-wait control structure.

The synchronization points that are placed into the code may be implemented as a post-wait control structure. The post-wait control structure may consist of a post primitive, a wait primitive and optionally, an update primitive. These primitives may be implemented using different approaches. FIGS. 5A-5B are example representations of the execution of the example DO loop of FIGS. 3A-3D.

In one embodiment, a low overhead implementation of the post-wait control structure may be utilized. This embodiment, may be referred to as a keep it simple and safe (KISS) approach. This embodiment, utilizes a single counter to synchronize the different threads that are assigned to execute the target code and specifically the code sequence that is parallelized. In this embodiment, multiple threads may be active at the same time but are restricted to post in lexicographical order. This embodiment guarantees semantic correctness even in the presence of non-deterministic execution behavior of individual iterations. Also, due to the use of a single counter for each post-wait control structure, the memory requirements are minimal.

The post command for this embodiment may be expressed as:

Post(I)
   WHILE (PW !=I-1) {wait}
   PW=I
   where PW is the counter value and I is the iteration of the current thread. Wait may be spin, sleep, vector, or any other type of wait.

The wait command for this embodiment may be expressed as:

Wait(w)
   WHILE (PW<w) {wait}
   where w is the iteration index which the iteration executed by the current thread is dependent on.

FIG. 5A is a diagram illustrating the operation of this embodiment. The diagram shows the status of the counter and the iteration of the DO loop of FIG. 3D being executed by each thread T1-T3. In this example, three threads are operating. Any number of threads may be assigned to execute the different iterations. The status of each thread and the counter is shown over progressive time slices 501-505. In a first time slice, iteration 2 is assigned to thread 1, iteration 3 to thread 2 and iteration 4 to thread three. The counter 511 starts with a value of 1. The iterations 2 through 4 were assigned to the threads 1 through 3 as they became available. In this example, three threads have been allotted to execute the code sequence. However, any number of threads may be assigned to a code sequence. During the first time slice each thread starts execution of its iteration and encounters the post-wait control structure protecting the critical section of each iteration.

In the example, the second time slice 503 shows the progress of each thread in executing the parallelized code sequence. Thread 1 completed the execution of iteration 2, because when it encountered the wait command the counter was set to 1. Iteration 2 was not dependent on any other iteration. As a result the wait command allowed the thread to continue execution. The post command was encounter after the critical section and the counter was updated to 2 and the thread continued execution. Similarly, thread 2 completed iteration 3. However, thread 3 had to wait at the wait command, because the counter which contained the value of 1, was not equal to or greater than the value that iteration 4 depended upon, that is iteration 2. As a result, thread 3 continues to execute iteration 4 in the second time slice 503.

Threads 2 and 3 have been assigned new iterations in the next time slice, iterations 5 and 6, respectively. In one embodiment, iterations may be assigned in order. During the second time slice 503, thread 1 and 3 complete their assigned iterations because the dependencies of each are greater than or equal to the counter value of 3. As a consequence, in time slice 505 these threads have been assigned the next two iterations. However, thread 2 is not able to complete its iteration until the third time slice 505, because it is dependent on iteration 4, which is greater than the value of the counter 511.

This embodiment does allow concurrent execution of threads. However, it does not maximally exploit the inherent parallelism due to the sequentialization of posts. A second embodiment improves upon the parallelization at the cost of greater memory requirements using an array to track code completion that is indexed by a modulus of a positive integer number. The second embodiment may be referred to as a Modulo-based approach or MAP.

In the MAP embodiment, a thread posts to a cell in a post-wait control data structure. The data structure may be an array or similar data or storage structure. Each thread posts a completion of its code sequence in a cell of the data structure indexed by: k mod PWsize, where k is the iteration number being executed on the thread and PWsize is any positive integer. A thread is able to write to a cell in the data structures only if the value in the cell that is indexed is equal to k-PWsize. If the thread is not able to write to the cell it waits. The KISS scheme may be considered a special case of MAP scheme where PWsize is equal to one. In one embodiment, the PWsize may be between the number of threads and twice the number of threads. A PWsize in this range may minimize memory requirements and unnecessary stalls from modulo mapping.

The post primitive for this embodiment may be expressed as:

POST(i)
   WHILE (post_wait [i mod PWsize] !=(i-PWsize)) {wait}
   post_wait[i mod PWsize]=i
   where i is the iteration index that the calling thread is executing, post-wait is the array of the post-wait control structure, and PWsize is the size of the post_wait array.

The wait primitive for this embodiment may be expressed as:

WAIT(w)
   WHILE (post_wait[w mod PWsize]<w) {wait}
   where w is the iteration index which the calling thread is dependent on.

This embodiment, ensures partial ordering between posts, thereby eliminating instances of a value in the array being written without being read, which would give rise to deadlocks. A thread waits if the iteration number it is waiting on is not in the appropriate cell of the data structure. Thus, it is not required to scan the entire data array only the appropriate cell of the array needs to be checked thereby minimizing computational overhead.

FIG. 5B is a diagram on an example execution of the DO loop of FIG. 3D by this embodiment of the post-wait control structure. This example shows the execution of iterations 1 through 8 over time slices 521 through 525 by threads 1 through 3, as well as the status of the tracking array 527 in each time slice. In the first time slice, the first three iterations, iteration 2, iteration 3 and iteration 4 are assigned in order to threads 1 through 3, respectively, as they become available. The tracking array 527 is in an initialized state or may contain previously executed iterations.

In this embodiment, when thread 1 and 2 execute the wait command they continue on past the wait command to execute the critical section of the code sequence, because they are not waiting on a value in their respective cells of the array. However, thread 3, executing iteration 4 waits, because the iteration 2, is not present in the appropriate cell. As threads 1 and 2 complete their critical sections and execute a post command, the appropriate cells in the data structure are updated, that is, in this example, iteration 2 is placed in cell 2 and iteration 3 is placed in cell 0.

In time slice 523, threads 1 and 2 have been assigned new iterations in order. Each thread checks the data structure for the awaited dependence, by indexing into the array using the modulo function on the awaited iteration and the number of threads. Thread 3, which is executing iteration 4 and awaiting iteration two checks the cell indexed by 2 mod 3, that is, cell 2 and finds that the awaited iteration has been completed. As a result of checking the data structure by each thread, thread 3 and thread 1 are able to continue execution, while thread 2 waits for iteration 4 to complete.

In time slice 525, new iterations have been assigned to threads 1 and 3. Thread 2 is able to proceed after checking the updated data structure to find iteration 4 has completed. This process requires minimal memory and is efficient, because only a single location needs to be checked in an array by each thread.

Although the MAP embodiment provides improved parallelism over the KISS embodiment, greater parallelism may be achieved. In a further embodiment, which may be referred to as a multiway yet safe (MYS) approach, the post-wait control structure includes two arrays that may be referred to as a 'last_done' array and a 'current' array. Each array may have a size equal to the number of threads. The last_done array tracks the number of the iteration completed last for each thread. The current array tracks the iteration being currently executed by each thread. In this embodiment, an additional primitive is utilized in addition to the post and wait commands. The additional update primitive assists in the tracking of additional state information to avoid deadlocks. The update may be placed at the top of a loop body. In one embodiment, the update command may be an atomic operation. Each time a new iteration is mapped to a thread, the thread records the iteration number in the current array. The post command in this embodiment does not have any restrictions, that is a thread can post as soon as it completes the execution of a critical section. A thread waits when the iteration it is waiting upon is being executed by another thread.

The post primitive for this embodiment may be expressed as:

Post(i)
  last_done [THREAD_NUM]=i;

The wait primitive for this embodiment may be expressed as:

Wait(w)
  L1: FOR (k=0; k<NUM_THREADS; k++)
    IF (last_done [k]==w) {continue execution}
    ELSE IF (current [k]==w) {GOTO L1}

The update primitive for this embodiment may be expressed as:

Update(i)
  current [THREAD_NUM]=i;

In another embodiment the last_done and current array may be mapped to a single combined array.

Figure 5C:
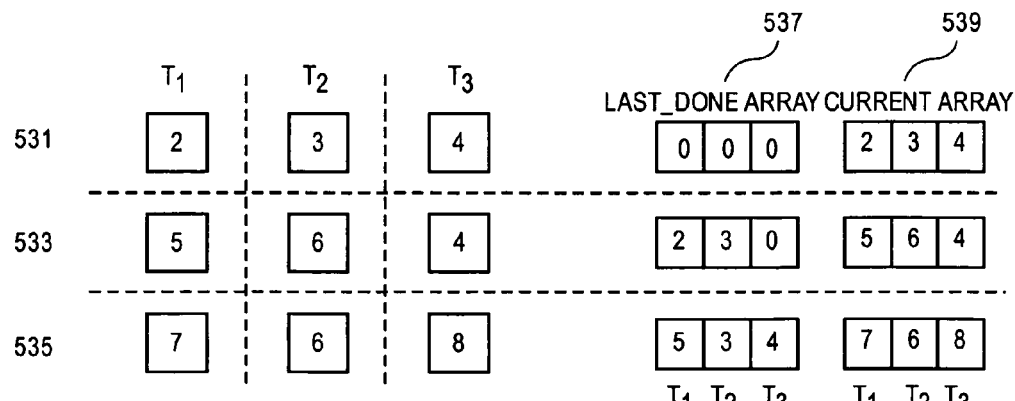
FIG. 5C is a diagram of one embodiment of a post-wait control structure.

FIG. 5C is a diagram of an example execution of the MYS embodiment. In the first time slice 531, the iterations 2 through 4 have been assigned to threads 1 through 3. The last_done array 537 is empty and the current array 539 reflects that threads 1 through 3 are executing iterations 2 through 4, respectively. Threads 1 and 2 complete and post their completion to the last_done array 537. Thread 3 is dependent on iteration 2, which the current array 539 indicates is still being executed.

In the next time slice 533, threads 1 and 2 have been assigned new iterations 5 and 6 to execute. Thread 3 completes the execution of iteration 4, because the iteration has been posted as completed and is no longer in the current array 539. Threads 1 and 3 complete and post their completed iterations to the last_done array 537.

In the last time slice 535, threads 1 and 3 have been assigned new iterations and thread 2 continues execution because the iteration 4 upon which it depends has been posted to the last_done array 537 and is no longer present in the current array 539.

The embodiments of the invention provide performance improvements over standard parallelization techniques. These performance improvements result from decreased overhead required for the synchronization models being used. Synchronization can account for a significant portion of total execution time. Optimizing synchronization can have a large impact on performance. The embodiments described above including the KISS, MAP and MYS implementations minimize the synchronization overhead and maximize parallel execution.

For an accurate evaluation of a synchronization model with respect to (w.r.t.) the incurred overhead, it is critical to compute the overhead incurred over static/dynamic execution. Both static and dynamic schedules incur scheduling overheads such as thread creation overhead. Also, it is important to note that the overhead incurred in static and dynamic scheduling need not follow a fixed pattern. Thus, to determine the overhead incurred by the underlying synchronization model, the overhead associated with static and dynamic schedules must be determined. The overhead measurements are based on a set of micro-benchmarks that show that the three post-wait control structure embodiments have ranges of overhead from 4% to 6%. The table below shows performance increase for two to four threads for each embodiment.

TABLE 1

| | Performance increase w.r.t. single threaded execution | | |
|---|---|---|---|
| | KISS | MAP | MYS |
| T2 | 1.06 | 1.04 | 1.05 |
| T3 | 1.12 | 1.25 | 1.24 |
| T4 | 1.43 | 1.45 | 1.46 |

In one embodiment, the post-wait control structures are implemented as hardware devices. In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method of comprising:
    detecting a first code sequence with internal dependencies that can be parallelized;
    inserting synchronization primitives automatically into the first code sequence to ensure coherent parallel processing of the first code sequence, the synchronization primitives to utilize a single counter that only includes a single value to synchronize different threads;
    assigning a first thread to a first iteration of the first code sequence;
    assigning a second thread to a second iteration of the first code sequence;
    determining the internal dependencies of the first and second iterations, the internal dependencies of the first and second iterations assigned first and second values;
    executing the first and second iterations of the first and second threads in parallel during a first time slice; and
    completing the first and second iterations during the first time slice in response to the first and second values being greater than or equal to the single value of the single counter.

2. The method of claim 1, wherein the first code sequence is a doacross loop.

3. The method of claim 1, wherein the first code sequence can be represented as a directed acyclic graph.

4. The method of claim 1, wherein the synchronization primitives utilize an array structure to which threads post based on a modulus of a positive integer number.

5. The method of claim 1, wherein the synchronization primitives utilize a first array to track a recent code execution completion for each thread and a second array to track a current code execution for each thread.

6. A method comprising:
    executing a sequence of code using a plurality of threads;
    encountering a wait command by a first thread;
    checking a data structure to determine if a condition of the wait command is met, the data structure being any one of a single counter that only includes a single value to enforce an order of execution and to synchronize the plurality of threads, an array to track code completion that is indexed by a modulus of a positive integer number, or a set of arrays to track a last code completed by a thread and a current code being executed by a thread;
    proceeding with the execution of the sequence of code if the condition of the wait command is met;
    assigning a third thread to a third iteration of the first code sequence;
    determining an internal dependency of the third iteration, the internal dependency of the third iteration assigned a third value;
    executing the third iteration of the third thread in parallel with the first and second threads during the first time slice;
    halting execution of the third iteration of the third thread in response to the third value being less than the single value of the single counter; and
    completing the third iteration during a second time slice after completion of the first and second iterations during the first time slice.

7. The method of claim 6, further comprising:
    updating the single counter each time a code section subsequent to a code section indicated by the single counter completes.

8. The method of claim 6, further comprising:
    updating the array if a thread completes a code section and a corresponding slot in the array contains an indicator that is within a minimum dependence distance.

9. The method of claim 6, further comprising:
    updating each array in the set of arrays if a thread completes to indicate a completed code section and a new code section to be executed.

10. The method of claim 6, wherein the wait command implements any one of a spin-wait, a sleep-wait or a vector-wait.

11. The method of claim 9, wherein updating is an atomic operation.

12. The method of claim 6, wherein the sequence of code is a doacross loop.

13. The method of claim 6, wherein the sequence of code can be represented as a directed acyclic graph.

14. An article of manufacturing comprising:
    a machine accessible medium, having a set of instructions stored therein, which when executed cause a machine to perform a set of operations comprising,
    analyzing a data stream including a code sequence having a set of internal dependencies;
    identifying the code sequence parallelizable;
    parallelizing the code sequence using a post-wait control structure, post-wait control structure including any one of a single counter to enforce an order of execution, an array to track code completion that is indexed by a modulus of a positive integer number, and/or a set of arrays to track a last code completed by a thread and a current code being executed by a thread, the post-wait control structure to utilize a single counter that only includes a single value to synchronize different threads;
    assigning a first thread to a first iteration of the code sequence;
    assigning a second thread to a second iteration of the code sequence;
    determining the internal dependencies of the first and second iterations, the internal dependencies of the first and second iterations assigned first and second values;
    executing the first and second iterations of the first and second threads in parallel during a first time slice; and completing the first and second iterations during the first time slice in response to the first and second values being greater than or equal to the single value of the single counter.

15. The article of manufacture of claim 14, wherein the data stream is a program.

16. The article of manufacture of claim 14, wherein the code sequence is a doacross loop.

17. The article of manufacture of claim 14, wherein the code sequence can be represented as a directed acyclic graph.

18. The article of manufacture of claim 14, wherein the post-wait control structure utilizes an array structure to which threads post completed code indicators based on a number of a thread and a modulus of a positive integer number.

19. The article of manufacture of claim 14, wherein the post-wait control structure utilizes a first array to track a recent code execution completion for each thread and a second array to track a current code execution for each thread.

20. A system comprising:
a processor; and
a compiler stored on a machine accessible medium, which when executed by the processor causes the system to perform a set of operations comprising,
building a graph of each iteration of a code sequence;
computing a minimal dependence distance;
identifying synchronization points in the code sequence;
inserting a synchronization mechanism, automatically in the code sequence to provide parallel execution of the code sequence, the synchronization mechanism to utilize a single counter that only includes a single value to synchronize different threads;
assigning a third thread to a third iteration of the first code sequence;
determining an internal dependency of the third iteration, the internal dependency of the third iteration assigned a third value;
executing the third iteration of the third thread in parallel with the first and second threads during the first time slice;
halting execution of the third iteration of the third thread in response to the third value being less than the single value of the single counter; and
completing the third iteration during a second time slice after completion of the first and second iterations during the first time slice.

21. The system of claim 20, wherein the compiler when executed by the processor causes the system to perform a set of operations further comprising,
removing redundant synchronization points.

22. The system of claim 20, wherein the compiler when executed by the processor causes the system to perform a set of operations further comprising,
identifying an earliest synchronization point for a post command.

23. The system of claim 20, wherein the compiler when executed by the processor causes the system to perform a set of operations further comprising,
identifying the latest synchronization point for a wait command.

24. The system of claim 20, wherein the compiler when executed by the processor causes the system to perform a set of operations further comprising,
mapping iterations of a code sequence as threads become available.

25. The system of claim 20, wherein the graph is a directed acyclic graph.

26. The system of claim 20, wherein the synchronization mechanism is a post-wait control structure and is placed at the synchronization points.

27. The system of claim 26, wherein the post-wait control structure includes any one of the single counter to enforce an order of execution, an array to track code completion that is indexed by a modulus of a positive integer number, and/or a set of arrays to track a last code completed by a thread and a current code being executed by a thread.

* * * * *